(12) United States Patent
Zhang et al.

(10) Patent No.: US 10,897,300 B2
(45) Date of Patent: Jan. 19, 2021

(54) INTERFERENCE COORDINATION METHOD AND APPARATUS

(71) Applicant: HUAWEI TECHNOLOGIES CO., LTD., Guangdong (CN)

(72) Inventors: Leiming Zhang, Beijing (CN); Yifan Liu, Shenzhen (CN); Ming Lei, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/566,202

(22) Filed: Sep. 10, 2019

(65) Prior Publication Data

US 2020/0007206 A1    Jan. 2, 2020

Related U.S. Application Data

(63) Continuation of application No. PCT/CN2018/077801, filed on Mar. 1, 2018.

(30) Foreign Application Priority Data

Mar. 28, 2017 (CN) .......................... 2017 1 0190731

(51) Int. Cl.
  *H04B 7/06* (2006.01)
  *H04B 7/024* (2017.01)
(52) U.S. Cl.
  CPC ............. *H04B 7/063* (2013.01); *H04B 7/024* (2013.01); *H04B 7/0617* (2013.01)
(58) Field of Classification Search
  CPC ....... H04B 7/063; H04B 7/024; H04B 7/0617
  USPC .......................................................... 375/267
  See application file for complete search history.

(56) References Cited

U.S. PATENT DOCUMENTS

| 9,438,321 | B2 | 9/2016 | Novlan et al. | |
|---|---|---|---|---|
| 2013/0229980 | A1* | 9/2013 | Wernersson | H04B 7/0617 370/328 |
| 2014/0126501 | A1 | 5/2014 | Pan et al. | |
| 2015/0304001 | A1 | 10/2015 | Tomeba et al. | |
| 2015/0325912 | A1 | 11/2015 | Liu | |
| 2016/0094284 | A1* | 3/2016 | Yum | H04B 7/063 375/267 |

(Continued)

FOREIGN PATENT DOCUMENTS

| CN | 101635929 A | 1/2010 |
|---|---|---|
| CN | 101686078 A | 3/2010 |

(Continued)

*Primary Examiner* — Ted M Wang
(74) *Attorney, Agent, or Firm* — Womble Bond Dickinson (US) LLP

(57) ABSTRACT

Embodiments of the present invention disclose an interference coordination method and apparatus. The method includes: receiving direction restriction information, where the direction restriction information includes angle restriction information, and the angle restriction information is used to indicate a restricted transmission direction; determining a signal preprocessing manner, where a transmission direction formed based on the signal preprocessing manner does not include the restricted transmission direction; and feeding back the signal preprocessing manner. According to the embodiments of the present invention, signaling overheads can be reduced, and an interference coordination application scenario can be expanded.

20 Claims, 4 Drawing Sheets

(56) References Cited

U.S. PATENT DOCUMENTS

2018/0131420 A1* 5/2018 Faxer .................. H04B 7/0658

FOREIGN PATENT DOCUMENTS

| | | |
|---|---|---|
| CN | 102025463 A | 4/2011 |
| CN | 102149099 A | 8/2011 |
| CN | 103052086 A | 4/2013 |
| CN | 104038943 A | 9/2014 |
| CN | 104144439 A | 11/2014 |
| EP | 2148546 A1 | 1/2010 |
| WO | 2015016512 A1 | 2/2015 |
| WO | 2016114708 A3 | 9/2016 |

* cited by examiner

INTERFERENCE COORDINATION METHOD AND APPARATUS

CROSS-REFERENCE TO RELATED APPLICATIONS

This application is a continuation of International Application No. PCT/CN2018/077801, filed on Mar. 1, 2018, which claims priority to Chinese Patent Application No. 201710190731.0, filed on Mar. 28, 2017. The disclosures of the aforementioned applications are hereby incorporated by reference in their entireties.

TECHNICAL FIELD

This application relates to the field of communications technologies, and in particular, to an interference coordination method and apparatus.

BACKGROUND

Inter-cell interference always exists in intra-frequency networking. Interference coordination can be implemented by demodulating an interfering signal in an interfered-with cell and eliminating an interfering signal component from a received signal by using a processing gain of a receiver. An interference coordination technology may include a soft frequency reuse technology, a multipoint coordination transmission technology, a beam coordination technology, or the like. In a long term evolution (Long Term Evolution, LTE) system, the beam coordination technology can be implemented by using a codebook subset restriction (codebook subset restriction) method, that is, restricting use of some codewords to prevent a user from using a beam that causes strong interference to a neighboring cell. In the codebook subset restriction method, a matched codeword may be selected from predefined channel information (codebook), and the matched codeword is fed back to a controller. However, in a 5G system, feedback manners of channel information such as linear synthesis of orthogonal bases, quantized channel information, and quantized covariance channel information aim to optimize channel quantization. A feedback principle of codeword feedback and a feedback principle of channel information feedback are essentially different. Consequently, the codebook subset restriction method causes excessive signaling overheads or cannot be used at all.

SUMMARY

A technical problem to be resolved by the embodiments of the present invention is to provide an interference coordination method and apparatus, to reduce signaling overheads and expand an interference coordination application scenario.

According to a first aspect, an embodiment of the present invention provides an interference coordination method. A terminal may receive direction restriction information sent by a controller. The direction restriction information may include angle restriction information, and the angle restriction information is used to indicate a restricted transmission direction. The terminal may further determine a signal preprocessing manner, and then the terminal may feed back the signal preprocessing manner to the controller. A transmission direction formed based on the signal preprocessing manner does not include the restricted transmission direction.

In one embodiment, the terminal indicates the restricted transmission direction through the angle restriction information, and one piece of angle restriction information may indicate at least one restricted transmission direction but does not repeatedly indicate a same restricted transmission direction. However, in a conventional codebook subset restriction method, some bits repeatedly indicate a same restricted transmission direction, and there is information redundancy, causing an increase in signaling overheads. For example, for a codebook pre-agreed in a protocol that is obtained through linear synthesis of orthogonal bases, a codeword W may be represented as W1W2, where W1 is a set of orthogonal discrete Fourier transform (Discrete Fourier Transform, DFT) matrices, and W2 is a combination coefficient of the set of orthogonal DFT matrices. If a quantity of codewords included in W1 is N1, and a quantity of codewords included in W2 is N2, a set size of W is N1*N2. In the conventional codebook subset restriction method, N1*N2 bits are required for avoiding feedback of an interfering beam, but some combinations in N1*N2 combinations indicate a same direction, and there is information redundancy. However, in this embodiment of the present invention, there is no information redundancy, and therefore signaling overheads can be reduced. In addition, this embodiment of the present invention is applicable to any channel feedback manner, and therefore an interference coordination application scenario can be expanded.

In one embodiment, the direction restriction information may further include correlation threshold information, and a correlation between the transmission direction formed based on the signal preprocessing manner and the restricted transmission direction is less than a correlation threshold indicated by the correlation threshold information.

In one embodiment, the correlation between the restricted transmission direction and the transmission direction formed by the signal preprocessing manner determined by the terminal is less than or equal to the correlation threshold. Compared with that the transmission direction formed based on the signal preprocessing manner does not include the restricted transmission direction, a larger range of data transmission can be restricted in this embodiment of the present invention, thereby effectively reducing inter-cell interference.

The correlation threshold information may include a correlation coefficient or second index indication information.

In one embodiment, the direction restriction information may further include angle threshold information, and an angle between the transmission direction formed based on the signal preprocessing manner and the restricted transmission direction is greater than an angle threshold indicated by the angle threshold information.

In one embodiment, the angle between the restricted transmission direction and the transmission direction formed by the signal preprocessing manner determined by the terminal is greater than or equal to the angle threshold. Compared with that the transmission direction formed based on the signal preprocessing manner does not include the restricted transmission direction, a larger range of data transmission can be restricted in this embodiment of the present invention, thereby effectively reducing inter-cell interference.

The angle threshold information may include the angle threshold or third index indication information.

The angle restriction information may include bitmap indication information or first index indication information.

The direction restriction information may further include quantized angle information, and the quantized angle information may be determined by the controller based on antenna configuration information and a codebook configuration parameter of the controller.

In one embodiment, the quantized angle information may include an angle value or a DFT matrix.

In one embodiment, the angle restriction information is used to indicate restricted transmission directions in at least two dimensions, and the transmission direction formed based on the signal preprocessing manner does not include a restricted transmission direction in each of the dimensions.

The direction restriction information may be received by the terminal through higher layer signaling and/or physical layer signaling.

According to a second aspect, an embodiment of the present invention provides a computer storage medium. The computer storage medium stores a program, and when the program is executed, some or all of the operations of the interference coordination method provided in the first aspect of the embodiments of the present invention are included.

According to a third aspect, an embodiment of the present invention provides an interference coordination apparatus. The interference coordination apparatus includes a module for performing the interference coordination method disclosed in the first aspect of the embodiments of the present invention.

BRIEF DESCRIPTION OF DRAWINGS

To describe the technical solutions in the embodiments or background of the present invention more clearly, the following briefly describes the accompanying drawings required for describing the embodiments or background of the present invention.

DESCRIPTION OF EMBODIMENTS

The following describes the embodiments of the present invention with reference to the accompanying drawings in the embodiments of the present invention.

Figure 1:
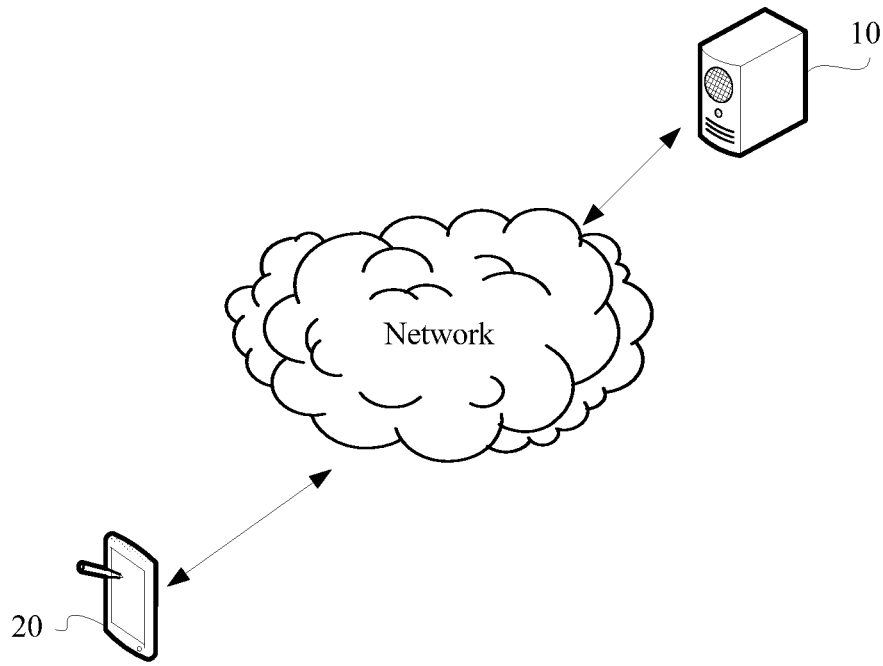
FIG. 1 is a schematic architectural diagram of an interference coordination system according to an embodiment of the present invention.

To better understand an interference coordination method and apparatus disclosed in the embodiments of the present invention, an application architecture applicable to the embodiments of the present invention is first described below. FIG. 1 is a schematic architectural diagram of an interference coordination system disclosed in an embodiment of the present invention. As shown in FIG. 1, the interference coordination system may include at least one controller 10 and at least one terminal 20. The terminal 20 and the controller 10 may transmit data to each other through a communication connection.

The controller 10 may be a device configured to communicate with a mobile station, and may be In one embodiment any one of an access point (AP) in a wireless local area network (WLAN), a base transceiver station (BTS) in a global system for mobile communications (GSM) or in a code division multiple access (CDMA) system, a NodeB (NB) in a wideband code division multiple access (WCDMA) system, an evolved NodeB (eNB) in an LTE system, and the like.

The terminal 20 may also be referred to as user equipment (UE), a mobile console, an access terminal, a subscriber unit, a subscriber station, a mobile station, a remote station, a remote terminal, a mobile device, a terminal, a wireless communications device, a user agent, a user apparatus, or the like. The terminal 20 may be In one embodiment any one of a station (ST) in a WLAN, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a mobile console in a future 5G network, a terminal device in a future evolved PLMN, and the like.

Before a specific embodiment is described, some brief descriptions are first given to concepts such as a base station, a cell, a frequency band, and a carrier that may be used. The cell mentioned in the embodiments of the present invention may be a cell corresponding to a base station, and the cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have characteristics of small coverage and low transmission power, and are applicable to a scenario in which a high-rate data transmission service is provided. In the present invention, a plurality of cells may simultaneously work at a same frequency on the carrier, causing inter-cell interference. Inter-cell interference may be reduced by restricting a user to using a beam that causes strong interference to a neighboring cell. In the embodiments of the present invention, each device that can perform data communication with the base station may be understood as a terminal, and a terminal in a general sense is described in the embodiments of the present invention.

Before a specific embodiment is described, some brief descriptions are first given to data that may be used in the embodiments of the present invention. The data includes at least one of the following: service data, control data, and a reference signal. For example, uplink data may include at least one of the following: service data that can be carried on a physical uplink shared channel (PUSCH), control data that can be carried on the PUSCH, control data that can be carried on a physical uplink control channel (PUCCH), an uplink demodulation reference signal (DMRS), and a sounding reference signal (SRS).

For another example, downlink data may include data carried on a downlink physical channel and/or a downlink reference signal. The downlink physical channel may include at least one of the following: a physical downlink shared channel (PDSCH), a physical broadcast channel (PBCH), a physical multicast channel (PMCH), a physical control format indicator channel (PCFICH), a physical downlink control channel (PDCCH), a physical hybrid automatic repeat request indicator channel (PHICH), an enhanced physical downlink control channel (EPDCCH), and an MTC physical downlink control channel (MPDCCH). The downlink reference signal may include at least one of the following: a cell-specific reference signal (CRS), a multimedia broadcast multicast service single frequency network reference signal (MBSFNRS), a user equipment-specific reference signal (US-RS) for demodulating data carried on the PDSCH, a reference signal (DM-RS) for demodulating data carried on the EPDCCH or the MPDCCH, a positioning reference signal (PRS), or a channel state information reference signal (CSI-RS).

It should be understood that the technical solutions in the embodiments of the present invention may be applied to various communications systems, for example, a GSM system, a CDMA system, a WCDMA system, a general packet radio service (GPRS) system, an LTE system, an LTE frequency division duplex (FDD) system, an LTE time division duplex (TDD) system, a universal mobile telecommunications system (UMTS), and a worldwide interoperability for microwave access (WiMAX) communications system.

Figure 2:
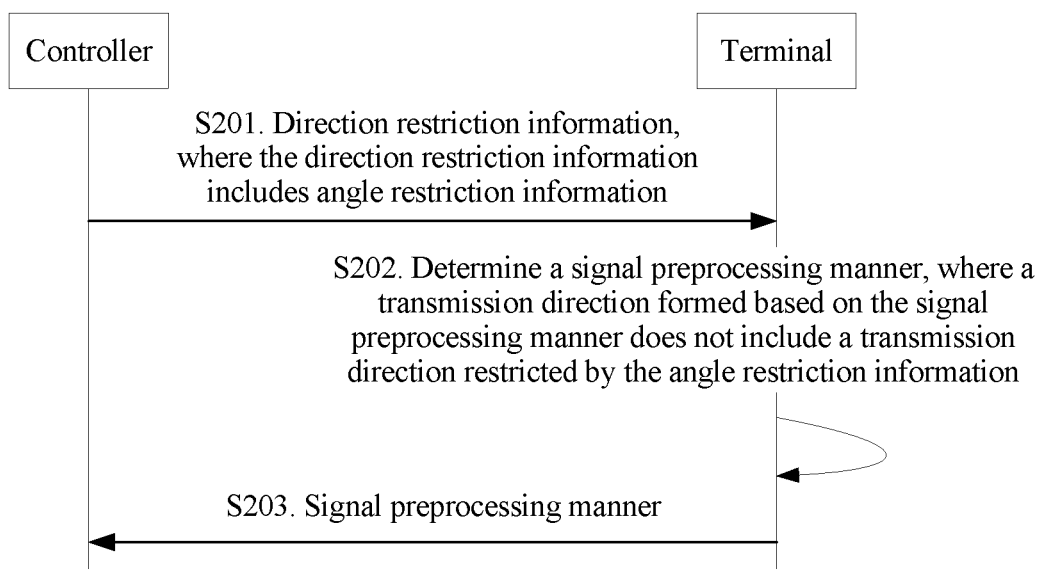
FIG. 2 is a schematic flowchart of an interference coordination method according to an embodiment of the present invention.

Based on the schematic architectural diagram of the interference coordination system shown in FIG. 1, FIG. 2 is a schematic flowchart of an interference coordination method according to an embodiment of the present invention. The method includes but is not limited to the following operations.

Operation S201: A controller sends direction restriction information to a terminal, where the direction restriction information includes angle restriction information.

In specific implementation, the controller may send the direction restriction information to the terminal, and the direction restriction information may be used to instruct the terminal to avoid feeding back channel information in a transmission direction the same as a transmission direction restricted by the direction restriction information. For example, the transmission direction restricted by the direction restriction information is $2\pi*2/32$, and a codeword corresponding to the restricted transmission direction is $V_m=[1 \ e^{j2\pi*m32} \ e^{j4\pi*m/32} \ e^{j6\pi*m/32}]^T$ in which m=2. In this case, when feeding back a signal preprocessing manner to the controller, the terminal may avoid feeding back the codeword $V_m=[1 \ e^{j2\pi*m32} \ e^{j4\pi*m/32} \ e^{j6\pi*m/32}]^T$ in which m=2 to the controller, so as to reduce inter-cell interference and reduce feedback complexity of the terminal.

The direction restriction information may include the angle restriction information, and the angle restriction information may include bitmap (Bitmap) indication information or first index indication information. For example, the controller may use 10 bits (bit) to indicate a restricted transmission direction. The first bit is used to indicate the first discrete angle value, and an $n^{th}$ bit is used to indicate an $n^{th}$ discrete angle value. A bit being "1" indicates that the terminal is prohibited from transmitting data in a direction of a discrete angle value corresponding to the bit, and a bit being "0" indicates that the terminal is allowed to transmit data in a direction of a discrete angle value corresponding to the bit.

In one embodiment, the direction restriction information may further include quantized angle information. The quantized angle information may include an angle value or a DFT matrix. In one embodiment, the quantized angle information may include a set of discrete angle values, and an interval between neighboring discrete angle values may be pre-agreed in a protocol or configured at an upper layer. The discrete angle value may fall within a range of [0°, 180°]. For example, the quantized angle information may be shown in Table 1:

TABLE 1

| 0 | 22.5 | 45 | 67.5 | 90 | 112.5 | 135 | 157.5 |
|---|---|---|---|---|---|---|---|

The quantized angle information includes eight discrete angle values, and an interval between the discrete angle values is 22.5°.

In one embodiment, the quantized angle information may include a DFT matrix corresponding to each discrete angle value. For example, the controller may generate, based on a discrete angle value, a DFT matrix corresponding to the discrete angle value. The DFT matrix included in the quantized angle information may be $V_m=[1 \ e^{j2\pi*m32} \ e^{j4\pi*m/32} \ e^{j6\pi*m/32}]^T$, where m is a natural number, and $0 \leq m \leq 15$. Further, another parameter required for generating the DFT matrix may be pre-agreed in a protocol or configured at an upper layer. For example, a correspondence between the discrete angle value and m in the DFT matrix may be shown in Table 2:

TABLE 2

| 0 | 22.5 | 45 | 67.5 | 90 | 112.5 | 135 | 157.5 |
|---|---|---|---|---|---|---|---|
| 0 | 2 | 4 | 6 | 8 | 10 | 12 | 14 |

The quantized angle information may be determined by the controller based on antenna configuration information and a codebook configuration parameter of the controller, or the quantized angle information may be pre-agreed in a protocol. In one embodiment, the controller may calculate, based on the antenna configuration and the codebook configuration parameter of the controller, a beam width used during data transmission, then determine a discrete angle interval based on the beam width, and obtain a set of discrete angle values based on the discrete angle interval. A difference between neighboring discrete angle values is the same as the discrete angle interval.

For example, if a quantity of discrete angle values is 8, the controller may use 8 bits to indicate a restricted transmission direction. The first bit is used to indicate the first discrete angle value, and an $n^{th}$ bit is used to indicate an $n^{th}$ discrete angle value. A bit being "1" indicates that the terminal is prohibited from transmitting data in a direction of a discrete angle value corresponding to the bit, and a bit being "0" indicates that the terminal is allowed to transmit data in a direction of a discrete angle value corresponding to the bit. For example, when the controller prohibits the terminal from transmitting data in a direction of 90°, the controller may determine that 90° in Table 1 is at a fifth location in the set of discrete angle values included in the quantized angle information, and the bitmap indication information may be "00001000". Alternatively, when the controller prohibits the terminal from transmitting data in directions of 90° and 135°, the controller may determine that 90° in Table 1 is at a fifth location in the set of discrete angle values included in the quantized angle information and that 135° is at a seventh location in the set of discrete angle values included in the quantized angle information, and the bitmap indication information may be "00001010".

For another example, the quantized angle information is shown in Table 1. The controller may set an index corresponding to 0° to 0, set an index corresponding to 22.5° to 1, set an index corresponding to 45° to 2, set an index corresponding to 67.5° to 3, set an index corresponding to 90° to 4, set an index corresponding to 112.5° to 5, set an index corresponding to 135° to 6, and set an index corresponding to 157.5° to 7. Further, the controller may convert, into an index of a binary format, an index corresponding to a discrete angle value corresponding to a direction in which data transmission is prohibited, and use the index of the binary format as the first index indication information. For example, when the controller prohibits the terminal from transmitting data in the direction of 90°, the controller may determine that the index corresponding to 90° is 4, and the first index indication information may be "0100". In one embodiment, when prohibiting the terminal from transmitting data in at least two directions, the controller may separately use 4 bits to indicate a restricted transmission direction. For example, when the controller prohibits the terminal from transmitting data in the directions of 90° and 135°, the controller may determine that the index corresponding to 90° is 4 and that the index corresponding to 135° is 6. In this case, the controller may indicate the discrete angle value 90° by using "0100", and indicate the discrete angle value 135° by using "0110". To be specific, the first index indication information may be "01000110".

The angle restriction information may be used to indicate a restricted transmission direction in at least one dimension. For example, the controller and the terminal may negotiate with each other to obtain the angle restriction information to indicate a restricted transmission direction in a horizontal direction, or the angle restriction information is used to indicate a restricted transmission direction in a vertical direction. When the angle restriction information is used to indicate restricted transmission directions in at least two dimensions, the controller may separately use a set of bit information to indicate angle restriction information in one dimension. For example, when the angle restriction information is the bitmap indication information, the controller may use 8 bits to indicate angle restriction information in a horizontal direction, and use other 8 bits to indicate angle restriction information in a vertical direction. For another example, when the angle restriction information is the first index indication information, the controller may use the first set of bit information to indicate angle restriction information in a horizontal direction, and use the second set of bit information to indicate angle restriction information in a vertical direction.

The direction restriction information may be sent by the controller through higher layer signaling and/or physical layer signaling.

In one embodiment, the direction restriction information may further carry rank restriction information for a quantity of layers, and the rank restriction information may be used to restrict a quantity of layers at which the terminal transmits data. In one embodiment, the rank restriction information may be jointly sent with the direction restriction information. To be specific, the controller sends the rank restriction information to the terminal when sending the direction restriction information to the terminal. In one embodiment, the rank restriction information may be sent separately from the direction restriction information. For example, the controller sends the rank restriction information to the terminal before sending the direction restriction information to the terminal. For another example, the controller sends the rank restriction information to the terminal after sending the rank restriction information to the terminal. It should be noted that the rank restriction information may be sent by the controller through higher layer signaling and/or physical layer signaling.

Operation S202: The terminal determines a signal preprocessing manner, where a transmission direction formed based on the signal preprocessing manner does not include the restricted transmission direction.

In specific implementation, after receiving the direction restriction information, the terminal may obtain the restricted transmission direction indicated by the angle restriction information, and generate a DFT matrix in the restricted transmission direction. Therefore, in a process of traversing a preset codebook, the terminal excludes a codeword corresponding to the DFT matrix, that is, selects a matched codeword from other codewords in the preset codebook that are different from the codeword corresponding to the DFT matrix.

For example, the quantized angle information shown in Table 1, the angle restriction information is the bitmap indication information, and the angle restriction information received by the terminal is 00001000. In this case, the terminal may determine that the discrete angle value at the fifth location in Table 1 is a direction in which the terminal is prohibited from transmitting data. To be specific, the terminal may avoid transmitting data in the direction of 90°. For another example, the quantized angle information shown in Table 1, the angle restriction information is the first index indication information, and the angle restriction information received by the terminal is 01000110. In this case, the terminal may determine that the discrete angle value corresponding to the index 4 or 6 is a direction in which the terminal is prohibited from transmitting data. To be specific, the terminal may avoid transmitting data in the directions of 90° and 135°.

In one embodiment, the angle restriction information may be used to indicate restricted transmission directions in at least two dimensions. In this case, the terminal may obtain, from the quantized angle information, the restricted transmission direction that is in each of the at least two dimensions and that is indicated by the angle restriction information. For example, quantized angle information in a horizontal direction and quantized angle information in a vertical direction both are shown in Table 1. Angle restriction information in the horizontal direction is the bitmap indication information, and the angle restriction information is 00001000. Angle restriction information in the vertical direction is the bitmap indication information, and the angle restriction information is 00001010. In this case, the terminal may determine that a restricted transmission direction in the horizontal direction is 90°, and restricted transmission directions in the vertical direction are 90° and 135°. For another example, quantized angle information in a horizontal direction and quantized angle information in a vertical direction both are shown in Table 1. Angle restriction information in the horizontal direction is the first index indication information, and the angle restriction information is 0100. Angle restriction information in the vertical direction is the first index indication information, and the first index indication information is 01000110. In this case, the terminal may determine that a restricted transmission direction in the horizontal direction is 90°, and restricted transmission directions in the vertical direction are 90° and 135°.

In one embodiment, the preset codebook may be a two-level codebook. In this case, the terminal may select a codeword with a maximum capacity from other codewords different from a restricted codeword in the two-level codebook, and use the codeword with the maximum capacity as a matched codeword. For example, for a codebook pre-agreed in a protocol that is a two-level codebook, a codeword W may be represented as W1W2, where W1 is a DFT matrix $V_m=[1\ e^{j2pi*m32}\ e^{j4pi*m/32}\ e^{j6pi*m/32}]^T$ and $0 \le m \le 15$; and W2 is phase angle information, an element of W2 is QPSK $\{1, j, -1, -j\}$ and W2 is used to match channels of two polarization antennas. A process of selecting a codebook by the terminal may be as follows: The terminal obtains downlink channel information H through measurement based on a downlink reference signal, and the terminal traverses the codebook pre-agreed in the protocol to calculate a metric (for example, a capacity), selects a matched codebook according to a rule (for example, a capacity is maximum), and feeds back the matched codeword to the controller. For example, when the restricted transmission direction is $2\pi*2/32$, during codebook selection, the terminal may not consider a codeword $W1=V_m=[1\ e^{j2pi*m/32}\ e^{j4pi*m/32}\ e^{j6pi*m/32}]^T$ in which m=2. To be specific, the terminal selects the matched codeword from other codewords different from $V_m$ in the preset codebook.

In one embodiment, the preset codebook may be a codebook obtained through linear synthesis of orthogonal bases. In this case, the terminal may obtain downlink channel information through measurement based on a downlink reference signal, perform singular value decomposition (Singular value decomposition, SVD) on a covariance matrix of the downlink channel information to obtain an eigenvector corresponding to a maximum eigenvalue, and use a neighboring codeword of a codeword corresponding to the eigenvector as a matched codeword. For example, for a codebook pre-agreed in a protocol that is a codebook obtained through linear synthesis of orthogonal bases, a codeword W may be represented as W1W2, where W1 is a set of orthogonal DFT matrices (for example, W1 is two orthogonal DFT matrices), and W2 is a combination coefficient of the set of orthogonal DFT matrices. A process of selecting a codebook by the terminal may be as follows: The terminal obtains downlink channel information H through measurement based on a downlink reference signal, and performs SVD decomposition on a covariance matrix R of the downlink channel information to obtain an eigenvector Vi corresponding to a maximum eigenvalue lamad_i; and the terminal may feed back the matched codeword to the controller based on the eigenvector. For example, when the restricted transmission direction is $2\pi*2/32$, the terminal may determine that $Vi=[1\ e^{j2pi*m/32}\ e^{j4pi*m/32}\ e^{j6pi*m/32}]^T$ in which m=2. The terminal may revise Vi, and denote a revised Vi as Vj, where Vj is adjacent to Vi. For example, $Vj=[1\ e^{j2pi*m/32}\ e^{j4pi*m/32}\ e^{j6pi*m/32}]^T$ in which m=3, and the terminal may search for W1 and W2 that match Vj, and feed back W=W1W2 to the controller.

Operation S203: The terminal feeds back the signal preprocessing manner to the controller.

In specific implementation, the terminal determines a restricted codeword corresponding to the restricted transmission direction, and after selecting a matched codeword from other codewords different from the restricted codeword in the preset codebook, feeds back the matched codeword to the controller.

In the method described in FIG. 2, the terminal receives the direction restriction information, where the direction restriction information includes the angle restriction information; determines the signal preprocessing manner, where the transmission direction formed based on the signal preprocessing manner does not include the restricted transmission direction; and feeds back the signal preprocessing manner. In this way, signaling overheads can be reduced, and an interference coordination application scenario can be expanded.

Figure 3:
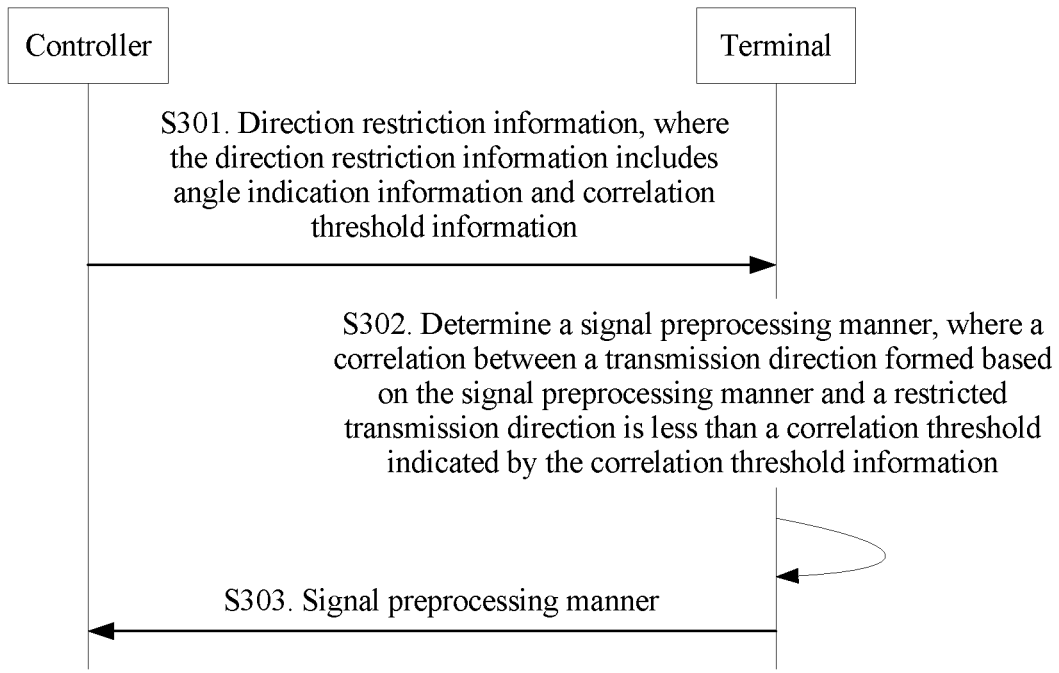
FIG. 3 is a schematic flowchart of an interference coordination method according to another embodiment of the present invention.

Based on the schematic architectural diagram of the interference coordination system shown in FIG. 1, FIG. 3 is a schematic flowchart of an interference coordination method according to an embodiment of the present invention. The method includes but is not limited to the following operations.

Operation S301: A controller sends direction restriction information to a terminal, where the direction restriction information includes angle restriction information and correlation threshold information.

In specific implementation, the controller may send the direction restriction information to the terminal, and the direction restriction information may be used to instruct the terminal to avoid feeding back channel information in a transmission direction the same as a transmission direction restricted by the direction restriction information and a correlation direction correlated with the direction restriction information. For example, the transmission direction restricted by the direction restriction information is $2\pi*2/32$, a codeword corresponding to the restricted transmission direction is $V_m=[1\ e^{j2\pi*m32}\ e^{j4\pi*m/32}\ e^{j6\pi*m/32}]^T$ in which m=2, and codewords corresponding to the correlation direction are $V_1=[1\ e^{j2\pi*m32}\ e^{j4\pi*m/32}\ e^{j6\pi*m/32}]^T$ in which m=1, and $V_m=[1\ e^{j2\pi*m32}\ e^{j4\pi*m/32}\ e^{j6\pi*m/32}]^T$ in which m=3. In this case, the terminal may avoid feeding back the codewords $V_m$, $V_1$, and $V_2$ to the controller when feeding back a matched codeword to the controller, so as to reduce inter-cell interference and effectively reduce feedback complexity of the terminal.

The direction restriction information may include the angle restriction information and the correlation threshold information. The correlation threshold information may include a correlation coefficient or second index indication information. For example, the correlation coefficient may be greater than 0 and less than 1. For example, when the correlation coefficient is 0.9, the terminal may determine that a correlation threshold indicated by the correlation threshold information is 0.9. The second index indication information may include a correspondence between each correlation threshold and an index. For example, the second index indication information may be shown in Table 3:

TABLE 3

| 1 | 0.9 | 0.8 | 0.7 |
|---|-----|-----|-----|
| 0 | 1   | 2   | 3   |

It can be learned from Table 3 that when the correlation threshold information is 0, the terminal may determine that the correlation threshold indicated by the correlation threshold information is 1; when the correlation threshold information is 1, the terminal may determine that the correlation threshold indicated by the correlation threshold information is 0.9; when the correlation threshold information is 2, the terminal may determine that the correlation threshold indicated by the correlation threshold information is 0.8; and when the correlation threshold information is 3, the terminal may determine that the correlation threshold indicated by the correlation threshold information is 0.7.

In one embodiment, the controller may convert an index corresponding to a specified correlation threshold into an index of a binary format, and use the index of the binary format as the second index indication information. For example, when the correlation threshold set by the controller is 1, the index corresponding to the correlation threshold is 0, and the second index indication information may be "00". When the correlation threshold set by the controller is 0.9, the index corresponding to the correlation threshold is 1, and the second index indication information may be "01". When the correlation threshold set by the controller is 0.8, the index corresponding to the correlation threshold is 2, and the second index indication information may be "10". When the correlation threshold set by the controller is 0.7, the index corresponding to the correlation threshold is 3, and the second index indication information may be "11".

In one embodiment, the direction restriction information may further include quantized angle information, and the quantized angle information may include an angle value or a DFT matrix. The quantized angle information may be determined by the controller based on antenna configuration information and a codebook configuration parameter of the controller, or the quantized angle information may be pre-agreed in a protocol.

The angle restriction information may include bitmap indication information or first index indication information.

The angle restriction information may be used to indicate a restricted transmission direction in at least one dimension.

The direction restriction information may be sent by the controller through higher layer signaling and/or physical layer signaling.

In one embodiment, the direction restriction information may further carry rank restriction information for a quantity of layers.

It should be noted that for operation S301, reference may also be correspondingly made to related descriptions of operation S201 in the method embodiment shown in FIG. 2. Details are not described again in this embodiment of the present invention.

Operation S302: The terminal determines a signal preprocessing manner, where a correlation between a transmission direction formed based on the signal preprocessing manner and the restricted transmission direction is less than the correlation threshold indicated by the correlation threshold information.

In specific implementation, after receiving the direction restriction information, the terminal may obtain the restricted transmission direction indicated by the angle restriction information, determine a restricted codeword corresponding to the restricted transmission direction, obtain a restricted DFT matrix in the restricted transmission direction and the correlation threshold indicated by the correlation threshold information, determine a correlation direction corresponding to a correlation matrix between which and the restricted DFT matrix a correlation is greater than or equal to the correlation threshold, use a correlation codeword corresponding to the correlation direction as the restricted codeword, and select a matched codeword from other codewords different from the restricted codeword in a preset codebook. For example, if the restricted transmission direction is $2\pi*2/32$, the terminal may determine that the restricted codeword corresponding to the restricted transmission direction is a codeword $[1 \ e^{j2pi*m32} \ e^{j4pi*m/32} \ e^{j6pi*m/32}]^T$ in which m=2.

The terminal may obtain the restricted DFT matrix in the restricted transmission direction. For example, if the restricted transmission direction is $2\pi*2/32$, the terminal may determine that the restricted DFT matrix in the restricted transmission direction is $[1 \ e^{j2pi*m32} \ e^{j4pi*m/32} \ e^{j6pi*m/32}]^T$ in which m=2.

The terminal may further obtain the correlation threshold indicated by the correlation threshold information. For example, when the correlation threshold information is the correlation coefficient, the terminal may use the correlation coefficient as the correlation threshold indicated by the correlation threshold information. For another example, when the correlation threshold information is the index 2, the terminal may determine that the correlation threshold indicated by the correlation threshold information is 0.8. For another example, when the correlation threshold information is "10", the terminal may determine that the correlation threshold indicated by the correlation threshold information is 0.8.

The terminal may further obtain a correlation between each DFT matrix and the restricted DFT matrix, use, as a correlation DFT matrix, a DFT matrix between which and the restricted DFT matrix a correlation is greater than or equal to the correlation threshold, and further obtain a correlation direction corresponding to the correlation DFT matrix. For example, the restricted DFT matrix is $V_m=[1 \ e^{j2\pi*m32} \ e^{j4\pi*m/32} \ e^{j6\pi*m/32}]^T$ in which m=2, and the other DFT matrices are $V_0=[1 \ e^{j2\pi*m32} \ e^{j4\pi*m/32} \ e^{j6\pi*m/32}]^T$ in which m=0, $V_1=[1 \ e^{j2\pi*m32} \ e^{j4\pi*m/32} \ e^{j6\pi*m/32}]^T$ in which m=1, and $V_2=[1 \ e^{j2\pi*m32} \ e^{j4\pi*m/32} \ e^{j6\pi*m/32}]^T$ in which m 3, and $V_4=[1 \ e^{j2\pi*m32} \ e^{j4\pi*m/32} \ e^{j6\pi*m/32}]^T$ in which m=4; the correlation threshold indicated by the correlation threshold information is 0.9; a correlation between $V_0$ and $V_m$ is 0.8; a correlation between $V_1$ and $V_m$ is 0.95; a correlation between $V_3$ and $V_m$ is 0.95; a correlation between $V_1$ and $V_m$ is 0.95; and a correlation between $V_4$ and $V_m$ is 0.8. In this case, the terminal may determine that correlation DFT matrices between which and $V_m$ a correlation is greater than or equal to the correlation threshold are $V_1$ and $V_3$, and further determine that a correlation direction corresponding to the correlation DFT matrix $V_1$ is $2\pi/32$, and a correlation direction corresponding to the correlation DFT matrix $V_3$ is $2\pi*3/32$.

The terminal may use the correlation codeword corresponding to the correlation direction as the restricted codeword. For example, if correlation directions are $2\pi/32$ and $2\pi*3/32$, the terminal may determine that a correlation codeword corresponding to the correlation direction $2\pi/32$ is a codeword $[1 \ e^{j2pi*m32} \ e^{j4pi*m/32} \ e^{j6pi*m/32}]^T$ in which m=1, and a correlation codeword corresponding to the correlation direction $2\pi*3/32$ is a codeword $[1 \ e^{j2pi*m32} \ e^{j4pi*m/32} \ e^{j6pi*m/32}]^T$ in which m=3. Further, the terminal may determine the correlation codewords as restricted codewords.

The terminal may select a matched codeword from other codewords different from the restricted codeword in the preset codebook. In specific implementation, the terminal may exclude the restricted codeword in a process of traversing the preset codebook, that is, select a matched codeword from other codewords different from the restricted codeword in the preset codebook. For example, if the preset codebook is $[1 \ e^{j2pi*m32} \ e^{j4pi*m/32} \ e^{j6pi*m/32}]^T$ in which m=0-15, and the restricted codeword is $[1 \ e^{j2pi*m32} \ e^{j4pi*m/32} \ e^{j6pi*m/32}]^T$ in which m=1, 2, or 3, the terminal may select the matched codeword from $[1 \ e^{j2pi*m32} \ e^{j4pi*m/32} \ e^{j6pi*m/32}]^T$ in which m=0 or 4-15.

In one embodiment, the preset codebook may be a two-level codebook. In this case, the terminal may select a codeword with a maximum capacity from other codewords different from the restricted codeword in the two-level codebook, and use the codeword with the maximum capacity as a matched codeword. For example, for a codebook pre-agreed in a protocol that is a two-level codebook, a codeword W may be represented as W1W2, where W1 is a DFT matrix $V_m=[1 \ e^{j2pi*m32} \ e^{j4pi*m/32} \ e^{j6pi*m/32}]^T$ and $0 \leq m \leq 15$; and W2 is phase angle information, an element of W2 is QPSK {1, j,−1,−j} and W2 is used to match channels of two polarization antennas. A process of selecting a codebook by the terminal may be as follows: The terminal obtains downlink channel information H through measurement based on a downlink reference signal, and the terminal traverses the codebook pre-agreed in the protocol to calculate a metric (for example, a capacity), selects a matched codebook according to a rule (for example, a capacity is maximum), and feeds back the matched codeword to the controller. For example, when the restricted transmission direction is 2π*2/32 and the correlation threshold is 0.9731, during codebook selection, the terminal may not consider a codeword $W1=V_m=[1\ e^{j2pi*m32}\ e^{j4pi*m/32}\ e^{j6pi*m/32}]^T$ in which m=1. To be specific, the terminal selects the matched codeword from other codewords different from $V_m$ in the preset codebook.

In one embodiment, the preset codebook may be a codebook obtained through linear synthesis of orthogonal bases. In this case, the terminal may obtain downlink channel information through measurement based on a downlink reference signal, perform SVD decomposition on a covariance matrix of the downlink channel information to obtain an eigenvector corresponding to a maximum eigenvalue, and use a neighboring codeword of a codeword corresponding to the eigenvector as a matched codeword. For example, for a codebook pre-agreed in a protocol that is a codebook obtained through linear synthesis of orthogonal bases, a codeword W may be represented as W1W2, where W1 is a set of orthogonal DFT matrices (for example, W1 is two orthogonal DFT matrices), and W2 is a combination coefficient of the set of orthogonal DFT matrices. A process of selecting a codebook by the terminal may be as follows: The terminal obtains downlink channel information H through measurement based on a downlink reference signal, and performs SVD decomposition on a covariance matrix R of the downlink channel information to obtain an eigenvector Vi corresponding to a maximum eigenvalue lamad_i. The terminal may feed back a matched codeword to the controller based on the eigenvector. For example, when the restricted transmission direction is 2π2/32, the terminal may determine that $Vi=[1\ e^{j2pi*m32}\ e^{j4pi*m/32}\ e^{j6pi*m/32}]^T$ in which m=2. The terminal may revise Vi, and denote a revised Vi as Vj. A correlation between Vj and Vi is less than the correlation threshold. For example, $Vj=[1\ e^{j2pi*m32}\ e^{j4pi*m/32}\ e^{j6pi*m/32}]^T$ in which m=4, and the terminal may search for W1 and W2 that match Vj, and feed back W=W1W2 to the controller.

Operation S303: The terminal feeds back the signal preprocessing manner to the controller.

In the method described in FIG. 3, the terminal receives the direction restriction information, where the direction restriction information includes the angle restriction information and the correlation threshold information; determines the signal preprocessing manner, where the correlation between the transmission direction formed based on the signal preprocessing manner and the restricted transmission direction is less than the correlation threshold indicated by the correlation threshold information; and feeds back the signal preprocessing manner. In this way, signaling overheads can be reduced, an interference coordination application scenario can be expanded, and inter-cell interference can be effectively reduced.

Figure 4:
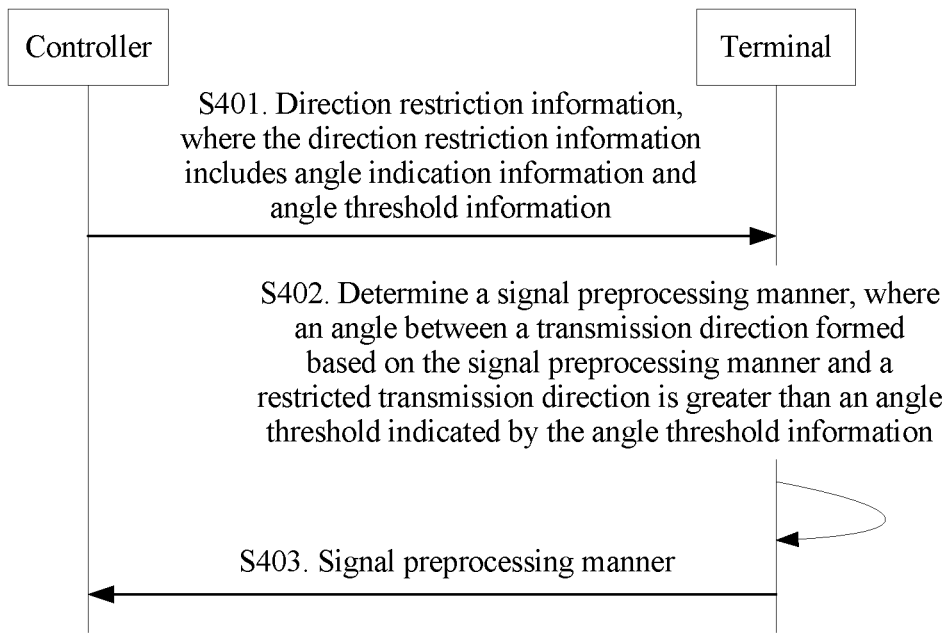
FIG. 4 is a schematic flowchart of an interference coordination method according to another embodiment of the present invention.

Based on the schematic architectural diagram of the interference coordination system shown in FIG. 1, FIG. 4 is a schematic flowchart of an interference coordination method according to an embodiment of the present invention. The method includes but is not limited to the following operations.

Operation S401: A controller sends direction restriction information to a terminal, where the direction restriction information includes angle restriction information and angle threshold information.

In specific implementation, the controller may send the direction restriction information to the terminal, and the direction restriction information may be used to instruct the terminal to avoid feeding back channel information in a transmission direction the same as a transmission direction restricted by the direction restriction information and a correlation direction correlated with the direction restriction information. For example, the transmission direction restricted by the direction restriction information is 2π*2/32, a codeword corresponding to the restricted transmission direction is $V_m=[1\ e^{j2\pi*m32}\ e^{j4\pi*m/32}\ e^{j6\pi*m/32}]^T$ in which m=2, and codewords corresponding to the correlation direction are $V_1=[1\ e^{j2\pi*m32}\ e^{j4\pi*m/32}\ e^{j6\pi*m/32}]^T$ in which m=1, and $V_2=[1\ e^{j2\pi*m32}\ e^{j4\pi*m/32}\ e^{j6\pi*m/32}]^T$ in which m=3. In this case, the terminal may avoid feeding back the codewords $V_m$, $V_1$, and $V_2$ to the controller when feeding back a matched codeword to the controller, so as to effectively reduce inter-cell interference, thereby reducing feedback complexity of the terminal.

The direction restriction information may include the angle restriction information and the angle threshold information. The angle threshold information may include an angle threshold or third index indication information. For example, the angle threshold may be 5°, 10°, or the like. The third index indication information may include a correspondence between each angle threshold and an index. For example, the third index indication information may be shown in Table 4.

TABLE 4

| 5° | 10° | 15° | 20° |
|---|---|---|---|
| 0 | 1 | 2 | 3 |

It can be learned from Table 4 that when the angle threshold information is 0, the terminal may determine that the angle threshold indicated by the angle threshold information is 5°; when the angle threshold information is 1, the terminal may determine that the angle threshold indicated by the angle threshold information is 10°; when the angle threshold information is 2, the terminal may determine that the angle threshold indicated by the angle threshold information is 15°; and when the angle threshold information is 3, the terminal may determine that the angle threshold indicated by the angle threshold information is 20°.

In one embodiment, the controller may convert an index corresponding to a specified angle threshold into an index of a binary format, and use the index of the binary format as the third index indication information. For example, when the angle threshold set by the controller is 5°, the index corresponding to the angle threshold is 0, and the third index indication information may be "00". When the angle threshold set by the controller is 10°, the index corresponding to the angle threshold is 1, and the third index indication information may be "01". When the angle threshold set by the controller is 15, the index corresponding to the angle threshold is 2, and the third index indication information may be "10". When the angle threshold set by the controller is 20, the index corresponding to the angle threshold is 3, and the third index indication information may be "11".

In one embodiment, the direction restriction information may further include quantized angle information, and the quantized angle information may include an angle value or a DFT matrix. The quantized angle information may be determined by the controller based on antenna configuration information and a codebook configuration parameter of the controller, or the quantized angle information may be pre-agreed in a protocol.

The angle restriction information may include bitmap indication information or first index indication information.

The angle restriction information may be used to indicate a restricted transmission direction in at least one dimension.

The direction restriction information may be sent by the controller through higher layer signaling and/or physical layer signaling.

In one embodiment, the direction restriction information may further carry rank restriction information for a quantity of layers.

It should be noted that for operation S401, reference may also be correspondingly made to related descriptions of operation S201 in the method embodiment shown in FIG. 2. Details are not described again in this embodiment of the present invention.

Operation S402: The terminal determines a signal preprocessing manner, where an angle between a transmission direction formed based on the signal preprocessing manner and the restricted transmission direction is greater than the angle threshold indicated by the angle threshold information.

In specific implementation, after receiving the direction restriction information, the terminal may obtain the restricted transmission direction indicated by the angle restriction information, determine a restricted codeword corresponding to the restricted transmission direction, obtain the angle threshold indicated by the angle threshold information, determine a correlation direction between which and the restricted transmission direction an angle is less than or equal to the angle threshold, use a correlation codeword corresponding to the correlation direction as a restricted codeword, and select a matched codeword from other codewords different from the restricted codeword in a preset codebook. For example, if the restricted transmission direction is $2\pi*2/32$, the terminal may determine that the restricted codeword corresponding to the restricted transmission direction is a codeword $[1\ e^{j2pi*m32}\ e^{j4pi*m/32}\ e^{j6pi*m/32}]^T$ in which m=2.

The terminal may obtain the angle threshold indicated by the angle threshold information. For example, when the angle threshold information is the angle value 5, the terminal may determine that the angle threshold indicated by the angle threshold information is 5°. For another example, when the angle threshold information is the index 2, the terminal may determine that the angle threshold indicated by the angle threshold information is 15°. For another example, when the angle threshold information is "10", the terminal may determine that the angle threshold indicated by the angle threshold information is 15°.

The terminal may obtain a direction between which and the restricted transmission direction an angle is less than or equal to a direction of the angle threshold, and use the direction as the correlation direction. For example, if the restricted transmission direction is $2\pi*2/32$, and the angle threshold is $\pi/16$, the terminal may determine that correlation directions between which and the restricted transmission direction an angle is less than or equal to the angle threshold are $2\pi/32$ and $2\pi*3/32$.

The terminal may use the correlation codeword corresponding to the correlation direction as the restricted codeword. For example, if correlation directions are $2\pi/32$ and $2\pi*3/32$, the terminal may determine that a correlation codeword corresponding to the correlation direction $2\pi/32$ is a codeword $[1\ e^{j2pi*m32}\ e^{j4pi*m/32}\ e^{j6pi*m/32}]^T$ in which m=1, and a correlation codeword corresponding to the correlation direction $2\pi*3/32$ is a codeword $[1\ e^{j2pi*m32}\ e^{j4pi*m/32}\ e^{j6pi*m/32}]^T$ in which m=3. Further, the terminal may determine the correlation codewords as restricted codewords.

The terminal may select a matched codeword from other codewords different from the restricted codeword in the preset codebook. In specific implementation, the terminal may exclude the restricted codeword in a process of traversing the preset codebook, that is, select a matched codeword from other codewords different from the restricted codeword in the preset codebook. For example, if the preset codebook is $[1\ e^{j2pi*m32}\ e^{j4pi*m/32}\ e^{j6pi*m/32}]^T$ in which m=0-15, and the restricted codeword is $[1\ e^{j2pi*m32}\ e^{j4pi*m/32}\ e^{j6pi*m/32}]^T$ in which m=1, 2, or 3, the terminal may select the matched codeword from $[1\ e^{j2pi*m32}\ e^{j4pi*m/32}\ e^{j6pi*m/32}]^T$ in which m=0 or 4-15.

In one embodiment, the preset codebook may be a two-level codebook. In this case, the terminal may select a codeword with a maximum capacity from other codewords different from the restricted codeword in the two-level codebook, and use the codeword with the maximum capacity as a matched codeword. For example, for a codebook pre-agreed in a protocol that is a two-level codebook, a codeword W may be represented as W1W2, where W1 is a DFT matrix $V_m=[1\ e^{j2pi*m32}\ e^{j4pi*m/32}\ e^{j6pi*m/32}]^T$ and $0 \le m \le 15$; and W2 is phase angle information, an element of W2 is QPSK$\{1, j, -1, -j\}$ and W2 is used to match channels of two polarization antennas. A process of selecting a codebook by the terminal may be as follows: The terminal obtains downlink channel information H through measurement based on a downlink reference signal, and the terminal traverses the codebook pre-agreed in the protocol to calculate a metric (for example, a capacity), selects a matched codebook according to a rule (for example, a capacity is maximum), and feeds back the matched codeword to the controller. For example, when the restricted transmission direction is $2\pi*2/32$ and the angle threshold is $\pi/16$, during codebook selection, the terminal may not consider a codeword $W1=V_m=[1\ e^{j2pi*m32}\ e^{j4pi*m/32}\ e^{j6pi*m/32}]^T$ in which m=1, 2, and 3. To be specific, the terminal selects the matched codeword from other codewords different from $V_m$ in the preset codebook.

In one embodiment, the preset codebook may be a codebook obtained through linear synthesis of orthogonal bases. In this case, the terminal may obtain downlink channel information through measurement based on a downlink reference signal, perform SVD decomposition on a covariance matrix of the downlink channel information to obtain an eigenvector corresponding to a maximum eigenvalue, and use a neighboring codeword of a codeword corresponding to the eigenvector as a matched codeword. For example, for a codebook pre-agreed in a protocol that is a codebook obtained through linear synthesis of orthogonal bases, a codeword W may be represented as W1W2, where W1 is a set of orthogonal DFT matrices (for example, W1 is two orthogonal DFT matrices), and W2 is a combination coefficient of the set of orthogonal DFT matrices. A process of selecting a codebook by the terminal may be as follows: The terminal obtains downlink channel information H through measurement based on a downlink reference signal, and performs SVD decomposition on a covariance matrix R of the downlink channel information to obtain an eigenvector Vi corresponding to a maximum eigenvalue lamad_i. The terminal may feed back a matched codeword to the controller based on the eigenvector. For example, when the restricted transmission direction is 2π2/32, the terminal may determine that $Vi=[1\ e^{j2pi*m32}\ e^{j4pi*m/32}\ e^{j6pi*m/32}]^T$ in which m=2. The terminal may revise Vi, and denote a revised Vi as Vj. An angle between Vj and Vi is greater than the angle threshold. For example, $Vj=[1\ e^{j2pi*m32}\ e^{j4pi*m/32}\ e^{j6pi*m/32}]^T$ in which m=4, and the terminal may search for W1 and W2 that match Vj, and feed back W=W1W2 to the controller.

Operation S403: The terminal feeds back the signal preprocessing manner to the controller.

In the method described in FIG. 4, the terminal receives the direction restriction information sent by the controller. The direction restriction information includes the angle restriction information and the angle threshold information. The terminal determines the signal preprocessing manner, and the angle between the transmission direction formed based on the signal preprocessing manner and the restricted transmission direction is greater than the angle threshold indicated by the angle threshold information. Further, the terminal feeds back the signal preprocessing manner to the controller. In this way, signaling overheads can be reduced, an interference coordination application scenario can be expanded, and inter-cell interference can be effectively reduced.

The methods in the embodiments of the present invention are described above in detail, and apparatuses in the embodiments of the present invention are provided below.

Figure 5:
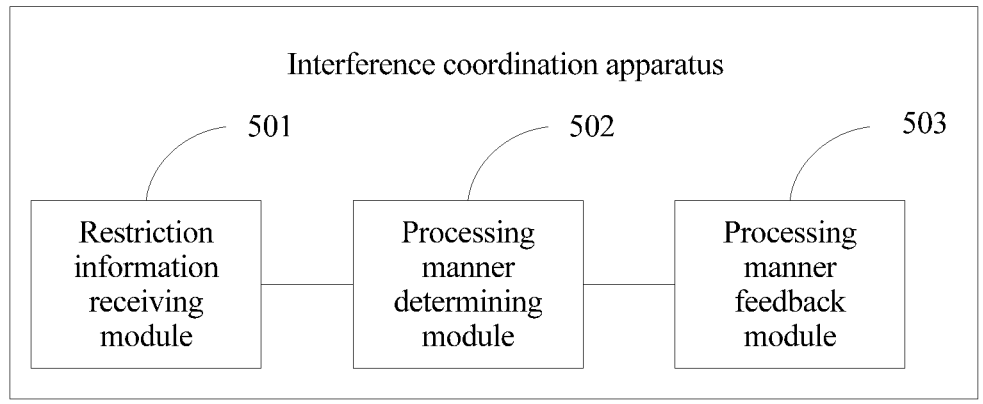
FIG. 5 is a schematic structural diagram of an interference coordination apparatus according to an embodiment of the present invention.

FIG. 5 is a schematic structural diagram of an interference coordination apparatus according to an embodiment of the present invention. The interference coordination apparatus may include a restriction information receiving module 501, a processing manner determining module 502, and a processing manner feedback module 503. Detailed descriptions of the modules are as follows.

The restriction information receiving module 501 is configured to receive direction restriction information, where the direction restriction information includes angle restriction information, and the angle restriction information is used to indicate a restricted transmission direction.

The processing manner determining module 502 is configured to determine a signal preprocessing manner, where a transmission direction formed based on the signal preprocessing manner does not include the restricted transmission direction.

The processing manner feedback module 503 is configured to feed back the signal preprocessing manner.

In one embodiment, the direction restriction information further includes correlation threshold information, and a correlation between the transmission direction formed based on the signal preprocessing manner and the restricted transmission direction is less than a correlation threshold indicated by the correlation threshold information.

In one embodiment, the correlation threshold information includes a correlation coefficient or second index indication information.

In one embodiment, the direction restriction information further includes angle threshold information, and an angle between the transmission direction formed based on the signal preprocessing manner and the restricted transmission direction is greater than an angle threshold indicated by the angle threshold information.

In one embodiment, the angle threshold information includes the angle threshold or third index indication information.

In one embodiment, the angle restriction information includes bitmap indication information or first index indication information.

In one embodiment, the angle restriction information is used to indicate restricted transmission directions in at least two dimensions, and the transmission direction formed based on the signal preprocessing manner does not include a restricted transmission direction in each of the dimensions.

It should be noted that for implementation of each module, reference may also be correspondingly made to related descriptions of the method embodiments shown in FIG. 2 to FIG. 4.

In the interference coordination apparatus described in FIG. 5, the restriction information receiving module 501 receives the direction restriction information. The direction restriction information includes the angle restriction information, and the angle restriction information is used to indicate the restricted transmission direction. The processing manner determining module 502 determines the signal preprocessing manner, and the transmission direction formed based on the signal preprocessing manner does not include the restricted transmission direction. The processing manner feedback module 503 feeds back the signal preprocessing manner. In this way, signaling overheads can be reduced, and an interference coordination application scenario can be expanded.

Figure 6:
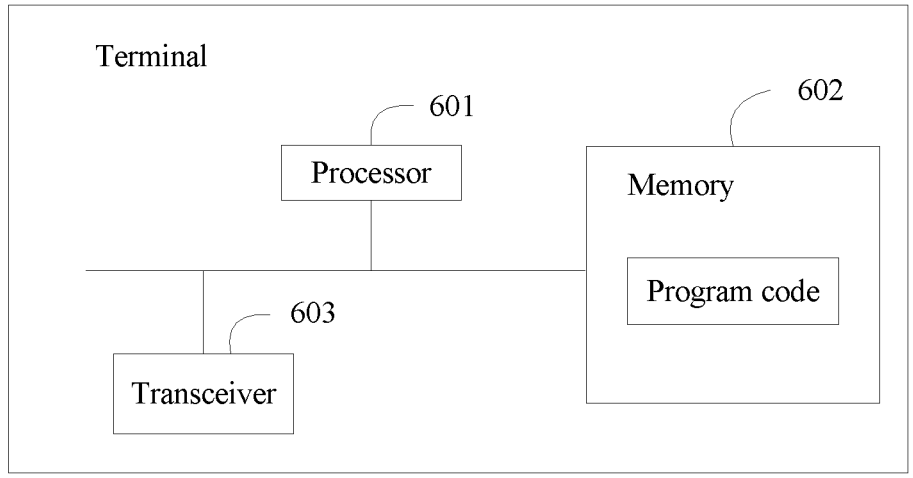
FIG. 6 is a schematic structural diagram of a terminal according to an embodiment of the present invention.

FIG. 6 shows a terminal provided in an embodiment of the present invention. The terminal includes a processor 601, a memory 602, and a transceiver 603. The processor 601, the memory 602, and the transceiver 603 are connected to each other by using a bus.

The memory 602 includes but is not limited to a random access memory (RAM), a read-only memory (ROM), an erasable programmable read only memory (EPROM), and a compact disc read-only memory (CD-ROM). The memory 602 is configured to store a related instruction and data. The transceiver 603 is configured to receive and send data.

The processor 601 may be one or more central processing units (CPU). When the processor 601 is one CPU, the CPU may be a single-core CPU, or may be a multi-core CPU.

The processor 601 in the terminal is configured to read program code stored in the memory 602, to perform the following operations:

receiving, by using the transceiver 603, direction restriction information, where the direction restriction information includes angle restriction information, and the angle restriction information is used to indicate a restricted transmission direction;

determining a signal preprocessing manner, where a transmission direction formed based on the signal preprocessing manner does not include the restricted transmission direction; and feeding back, by using the transceiver 603, the signal preprocessing manner.

In one embodiment, the direction restriction information may further include correlation threshold information, and a correlation between the transmission direction formed based on the signal preprocessing manner and the restricted transmission direction is less than a correlation threshold indicated by the correlation threshold information.

In one embodiment, the correlation threshold information includes a correlation coefficient or second index indication information.

In one embodiment, the direction restriction information may further include angle threshold information, and an angle between the transmission direction formed based on the signal preprocessing manner and the restricted transmission direction is greater than an angle threshold indicated by the angle threshold information.

In one embodiment, the angle threshold information includes the angle threshold or third index indication information.

In one embodiment, the angle restriction information includes bitmap indication information or first index indication information.

In one embodiment, the angle restriction information is used to indicate restricted transmission directions in at least two dimensions, and the transmission direction formed based on the signal preprocessing manner does not include a restricted transmission direction in each of the dimensions.

It should be noted that for implementation of each operation, reference may also be correspondingly made to related descriptions of the method embodiments shown in FIG. 2 to FIG. 4.

In the terminal described in FIG. 6, the processor 601 receives the direction restriction information by using the transceiver 603, where the direction restriction information includes the angle restriction information, and the angle restriction information is used to indicate the restricted transmission direction; determines the signal preprocessing manner, where the transmission direction formed based on the signal preprocessing manner does not include the restricted transmission direction; and feeds back the signal preprocessing manner by using the transceiver 603. In this way, signaling overheads can be reduced, and an interference coordination application scenario can be expanded.

Figure 7:
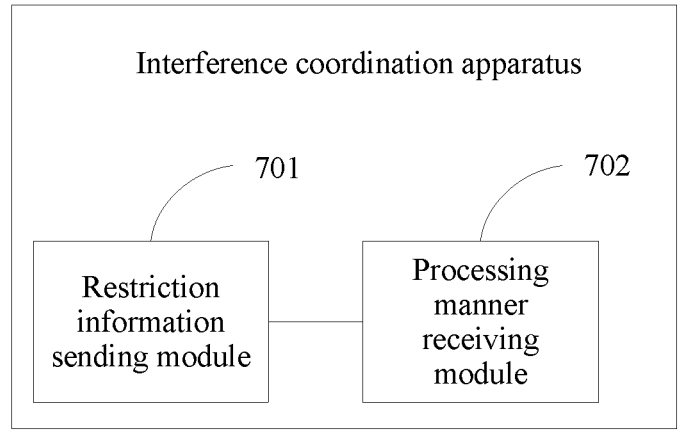
FIG. 7 is a schematic structural diagram of an interference coordination apparatus according to another embodiment of the present invention.

FIG. 7 is a schematic structural diagram of an interference coordination apparatus according to an embodiment of the present invention. The interference coordination apparatus may include a restriction information sending module 701 and a processing manner receiving module 702. Detailed descriptions of the modules are as follows.

The restriction information sending module 701 is configured to send direction restriction information, where the direction restriction information includes angle restriction information, and the angle restriction information is used to indicate a restricted transmission direction.

The processing manner receiving module 702 is configured to receive a signal preprocessing manner, where a transmission direction formed based on the signal preprocessing manner does not include the restricted transmission direction.

In one embodiment, the direction restriction information further includes correlation threshold information, and a correlation between the transmission direction formed based on the signal preprocessing manner and the restricted transmission direction is less than a correlation threshold indicated by the correlation threshold information.

In one embodiment, the correlation threshold information includes a correlation coefficient or second index indication information.

In one embodiment, the direction restriction information further includes angle threshold information, and an angle between the transmission direction formed based on the signal preprocessing manner and the restricted transmission direction is greater than an angle threshold indicated by the angle threshold information.

In one embodiment, the angle threshold information includes the angle threshold or third index indication information.

In one embodiment, the angle restriction information includes bitmap indication information or first index indication information.

In one embodiment, the angle restriction information is used to indicate restricted transmission directions in at least two dimensions, and the transmission direction formed based on the signal preprocessing manner does not include a restricted transmission direction in each of the dimensions.

It should be noted that for implementation of each module, reference may also be correspondingly made to related descriptions of the method embodiments shown in FIG. 2 to FIG. 4.

In the interference coordination apparatus described in FIG. 7, the restriction information sending module 701 sends the direction restriction information. The direction restriction information includes the angle restriction information, and the angle restriction information is used to indicate the restricted transmission direction. The processing manner receiving module 702 receives the signal preprocessing manner, and the transmission direction formed based on the signal preprocessing manner does not include the restricted transmission direction. In this way, signaling overheads can be reduced, and an interference coordination application scenario can be expanded.

Figure 8:
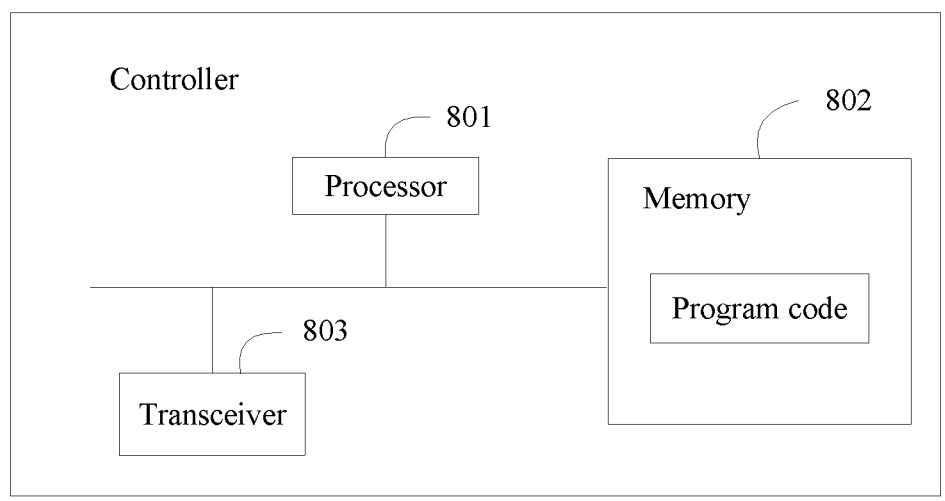
FIG. 8 is a schematic structural diagram of a terminal according to another embodiment of the present invention.

FIG. 8 shows a controller provided in an embodiment of the present invention. The controller includes a processor 801, a memory 802, and a transceiver 803. The processor 801, the memory 802, and the transceiver 803 are connected to each other by using a bus.

The memory 802 includes but is not limited to a random access memory (RAM), a read-only memory (ROM), an erasable programmable read only memory (EPROM), or a compact disc read-only memory (CD-ROM). The memory 802 is configured to store a related instruction and data. The transceiver 603 is configured to receive and send data.

The processor 801 may be one or more central processing units (CPU).

When the processor 801 is one CPU, the CPU may be a single-core CPU, or may be a multi-core CPU.

The processor 801 in the terminal is configured to read program code stored in the memory 802, to perform the following operations:

sending, by using the transceiver 803, direction restriction information, where the direction restriction information includes angle restriction information, and the angle restriction information is used to indicate a restricted transmission direction; and receiving, by using the transceiver 603, a signal preprocessing manner, where a transmission direction formed based on the signal preprocessing manner does not include the restricted transmission direction.

In one embodiment, the direction restriction information may further include correlation threshold information, and a correlation between the transmission direction formed based on the signal preprocessing manner and the restricted transmission direction is less than a correlation threshold indicated by the correlation threshold information.

In one embodiment, the correlation threshold information includes a correlation coefficient or second index indication information.

In one embodiment, the direction restriction information may further include angle threshold information, and an angle between the transmission direction formed based on the signal preprocessing manner and the restricted transmission direction is greater than an angle threshold indicated by the angle threshold information.

In one embodiment, the angle threshold information includes the angle threshold or third index indication information.

In one embodiment, the angle restriction information includes bitmap indication information or first index indication information.

In one embodiment, the angle restriction information is used to indicate restricted transmission directions in at least two dimensions, and the transmission direction formed based on the signal preprocessing manner does not include a restricted transmission direction in each of the dimensions.

It should be noted that for implementation of each operation, reference may also be correspondingly made to related descriptions of the method embodiments shown in FIG. 2 to FIG. 4.

In the controller described in FIG. 8, the processor 801 sends the direction restriction information by using the transceiver 603, where the direction restriction information includes the angle restriction information, and the angle restriction information is used to indicate the restricted transmission direction; and receives the signal preprocessing manner by using the transceiver 603, where the transmission direction formed based on the signal preprocessing manner does not include the restricted transmission direction. In this way, signaling overheads can be reduced, and an interference coordination application scenario can be expanded.

In one aspect, an interference coordination method comprises sending direction restriction information, wherein the direction restriction information comprises angle restriction information, and the angle restriction information is used to indicate a restricted transmission direction, and receiving a signal preprocessing manner, wherein a transmission direction formed based on the signal preprocessing manner does not comprise the restricted transmission direction. In one embodiment, the direction restriction information further comprises correlation threshold information, and a correlation between the transmission direction formed based on the signal preprocessing manner and the restricted transmission direction is less than a correlation threshold indicated by the correlation threshold information. In one embodiment, the correlation threshold information comprises a correlation coefficient or second index indication information. In one embodiment, the direction restriction information further comprises angle threshold information, and an angle between the transmission direction formed based on the signal preprocessing manner and the restricted transmission direction is greater than an angle threshold indicated by the angle threshold information. In one embodiment, the angle threshold information comprises the angle threshold or third index indication information. In one embodiment, the angle restriction information comprises bitmap indication information or first index indication information. In one embodiment, the angle restriction information is used to indicate restricted transmission directions in at least two dimensions, and the transmission direction formed based on the signal preprocessing manner does not comprise a restricted transmission direction in each of the dimensions.

A person of ordinary skill in the art may understand that all or some of the processes of the methods in the foregoing embodiments may be completed by a computer program instructing related hardware, and the program may be stored in a computer readable storage medium. When the program is executed, the processes in the method embodiments may be included. The storage medium includes: any medium that can store program code, such as a ROM or a random access memory RAM, a magnetic disk, or an optical disc.

What is claimed is:

1. An interference coordination method, comprising:
receiving direction restriction information, wherein the direction restriction information comprises angle restriction information, and the angle restriction information is used to indicate a restricted transmission direction, wherein the direction restriction information further comprises at least one of: correlation threshold information indicative of a correlation threshold, or angle threshold information indicative of an angle threshold;
determining a signal preprocessing manner, wherein a transmission direction formed based on the signal preprocessing manner does not comprise the restricted transmission direction; and
feeding back the signal preprocessing manner.

2. The method according to claim 1, wherein the direction restriction information further comprises the correlation threshold information, and a correlation between the transmission direction formed based on the signal preprocessing manner and the restricted transmission direction is less than the correlation threshold indicated by the correlation threshold information.

3. The method according to claim 2, wherein the correlation threshold information comprises a correlation coefficient or second index indication information.

4. The method according to claim 1, wherein the direction restriction information further comprises the angle threshold information, and an angle between the transmission direction formed based on the signal preprocessing manner and the restricted transmission direction is greater than the angle threshold indicated by the angle threshold information.

5. The method according to claim 4, wherein the angle threshold information comprises the angle threshold or third index indication information.

6. The method according to claim 1, wherein the angle restriction information comprises bitmap indication information or first index indication information.

7. The method according to claim 1, wherein the angle restriction information is used to indicate restricted transmission directions in at least two dimensions, and the transmission direction formed based on the signal preprocessing manner does not comprise a restricted transmission direction in each of the dimensions.

8. An interference coordination apparatus comprising:
a restriction information receiving module, configured to receive direction restriction information, wherein the direction restriction information comprises angle restriction information, and the angle restriction information is used to indicate a restricted transmission direction, wherein the direction restriction information further comprises at least one of: correlation threshold information indicative of a correlation threshold, or angle threshold information indicative of an angle threshold;
a processing manner determining module, configured to determine a signal preprocessing manner, wherein a transmission direction formed based on the signal preprocessing manner does not comprise the restricted transmission direction; and
a processing manner feedback module, configured to feed back the signal preprocessing manner.

9. The apparatus according to claim 8, wherein the direction restriction information further comprises the correlation threshold information, and a correlation between the transmission direction formed based on the signal preprocessing manner and the restricted transmission direction is less than the correlation threshold indicated by the correlation threshold information.

10. The apparatus according to claim 9, wherein the correlation threshold information comprises a correlation coefficient or second index indication information.

11. The apparatus according to claim 8, wherein the direction restriction information further comprises the angle threshold information, and an angle between the transmission direction formed based on the signal preprocessing manner and the restricted transmission direction is greater than the angle threshold indicated by the angle threshold information.

12. The apparatus according to claim 11, wherein the angle threshold information comprises the angle threshold or third index indication information.

13. The apparatus according to claim 8, wherein the angle restriction information comprises bitmap indication information or first index indication information.

14. The apparatus according to claim 8, wherein the angle restriction information is used to indicate restricted transmission directions in at least two dimensions, and the transmission direction formed based on the signal preprocessing manner does not comprise a restricted transmission direction in each of the dimensions.

15. An interference coordination apparatus, comprising:
 a restriction information sending module, configured to send direction restriction information, wherein the direction restriction information comprises angle restriction information, and the angle restriction information is used to indicate a restricted transmission direction, wherein the direction restriction information further comprises at least one of: correlation threshold information indicative of a correlation threshold, or angle threshold information indicative of an angle threshold; and
 a processing manner receiving module, configured to receive a signal preprocessing manner, wherein a transmission direction formed based on the signal preprocessing manner does not comprise the restricted transmission direction.

16. The apparatus according to claim 15, wherein the direction restriction information further comprises the correlation threshold information, and a correlation between the transmission direction formed based on the signal preprocessing manner and the restricted transmission direction is less than the correlation threshold indicated by the correlation threshold information.

17. The apparatus according to claim 16, wherein the correlation threshold information comprises a correlation coefficient or second index indication information.

18. The apparatus according to claim 15, wherein the direction restriction information further comprises the angle threshold information, and an angle between the transmission direction formed based on the signal preprocessing manner and the restricted transmission direction is greater than the angle threshold indicated by the angle threshold information.

19. The apparatus according to claim 18, wherein the angle threshold information comprises the angle threshold or third index indication information.

20. The apparatus according to claim 15, wherein the angle restriction information comprises bitmap indication information or first index indication information.

* * * * *